US011937288B2

(12) United States Patent
Patel

(10) Patent No.: US 11,937,288 B2
(45) Date of Patent: Mar. 19, 2024

(54) BASE STATION SELECTION OF UE UPLINK CONFIGURATION

(71) Applicant: T-Mobile USA, Inc., Bellevue, WA (US)

(72) Inventor: Nishant Patel, Irvine, CA (US)

(73) Assignee: T-Mobile USA, Inc., Bellevue, WA (US)

( * ) Notice: Subject to any disclaimer, the term of this patent is extended or adjusted under 35 U.S.C. 154(b) by 161 days.

(21) Appl. No.: 17/494,637

(22) Filed: Oct. 5, 2021

(65) Prior Publication Data

US 2023/0106410 A1 Apr. 6, 2023

(51) Int. Cl.
 *H04W 72/542* (2023.01)
 *H04B 7/06* (2006.01)
 *H04W 24/02* (2009.01)
 *H04W 72/20* (2023.01)

(52) U.S. Cl.
 CPC ........ *H04W 72/542* (2023.01); *H04B 7/0632* (2013.01); *H04W 72/20* (2023.01); *H04W 24/02* (2013.01)

(58) Field of Classification Search
 None
 See application file for complete search history.

(56) References Cited

U.S. PATENT DOCUMENTS

| 9,036,583 | B2 | 5/2015 | Lim et al. |
| 10,716,101 | B2 | 7/2020 | Bala et al. |
| 2014/0169317 | A1 | 6/2014 | Gao et al. |
| 2016/0127055 | A1* | 5/2016 | Dayal ............... H04L 5/0085 370/252 |

FOREIGN PATENT DOCUMENTS

| WO | WO-2013013376 A1 * | 1/2013 | ........... H04B 7/0404 |
| WO | WO2017024432 A1 | 2/2017 | |

OTHER PUBLICATIONS

Extended European Search Report dated Feb. 7, 2023 for European Patent Application No. 22199424.7, 5 pages.
Huawei, et al, "CR for intra-band UL CA non-contiguous CA requirement", 3GPP, vol. RAN WG4, Nov. 16, 2020, 54 pages.
Nokia, et al, "UE capabilities for Tx switching for UL MIMO", 3GPP, vol. RAN WG2, Feb. 14, 2020, 8 pages.

* cited by examiner

*Primary Examiner* — Ayanah S George
(74) *Attorney, Agent, or Firm* — Lee & Hayes P.C.

(57) ABSTRACT

A base station of a telecommunication network can determine whether a user equipment (UE) should use a two-layer uplink configuration or an uplink carrier aggregation (CA) configuration for uplink transmissions to the base station, based on radio condition metrics reported by the UE to the base station. If radio condition metrics reported by the UE satisfy two-layer uplink criteria, the base station can instruct the UE to switch to using the two-layer uplink configuration. If radio condition metrics reported by the UE do not satisfy the two-layer uplink criteria, the base station can instruct the UE to switch to using the uplink CA configuration.

20 Claims, 4 Drawing Sheets

BASE STATION SELECTION OF UE UPLINK CONFIGURATION

BACKGROUND

In a telecommunication network, a user equipment (UE) can wirelessly connect to a base station in order to engage in voice calls, video calls, data transfers, or other types of communications. For example, a mobile device, such as a smart phone, can wirelessly connect to a gNB or other base station of a radio access network (RAN) to access the telecommunication network.

The UE can connect to the base station using one or more frequency bands that are supported by both the UE and the base station. Through such connections, the UE can send data to the base station, and receive data from the base station. For example, the UE can send uplink transmissions to the base station to upload data, to transmit voice and/or video data during calls, to submit requests for services, or to perform any other operation that involves transmitting data to the base station.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
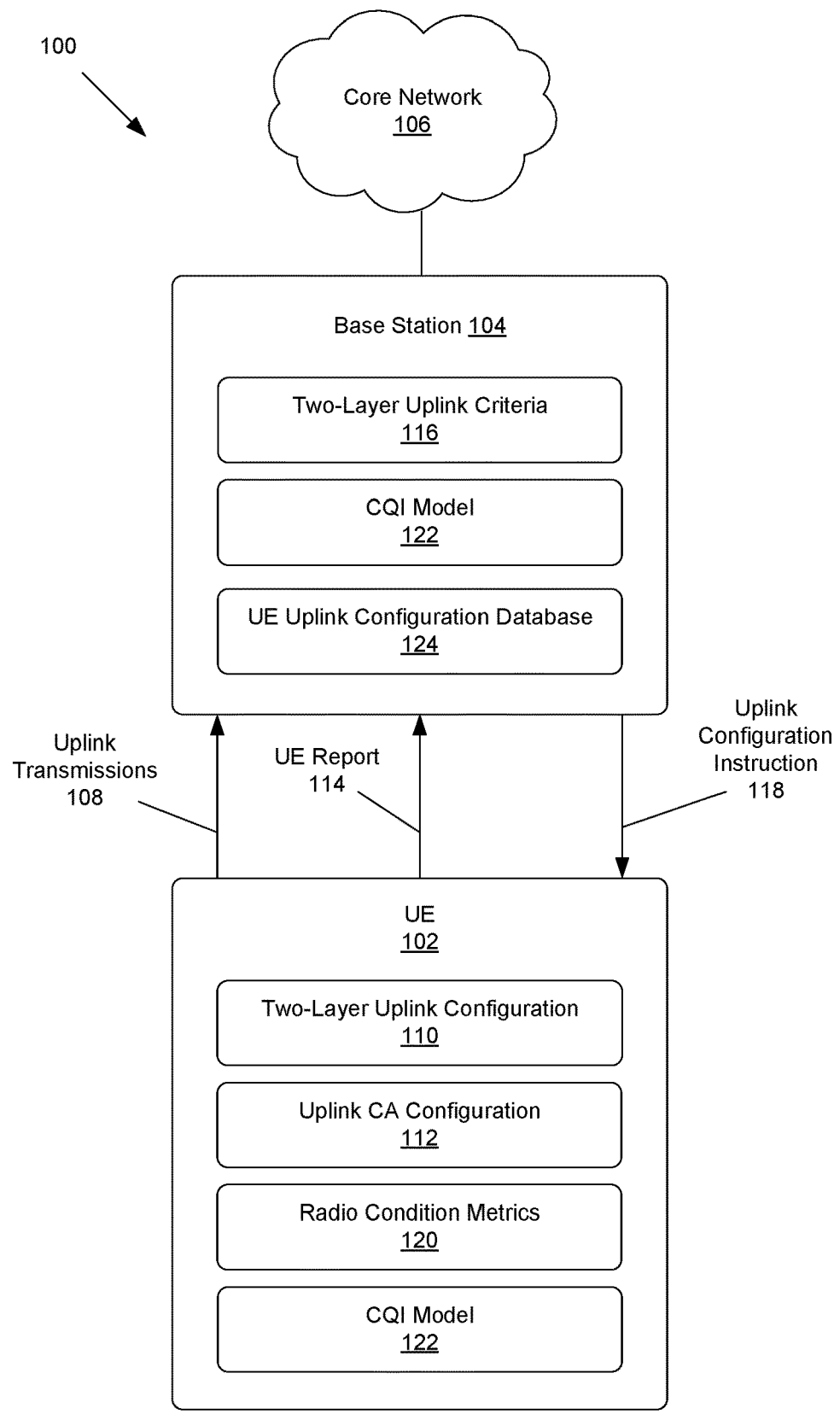
FIG. 1 shows an example of a network environment in which a UE can connect to a base station of a telecommunication network.

A UE can wirelessly connect to a base station of a telecommunication network, such as a gNB of a fifth generation (5G) New Radio (NR) radio access network. When connected to the base station, the UE can send uplink data to the base station and receive downlink data from the base station.

The UE and the base station can support two-layer uplink transmissions from the UE to the base station. During two-layer uplink transmissions, the UE can use two uplink layers to transmit data to the base station. In some situations, the use of two uplink layers can allow the UE to double uplink transmission throughput, relative to using a single uplink layer for uplink transmissions.

The UE and the base station can also support uplink carrier aggregation (CA). During uplink CA transmissions, the UE can use multiple component carriers in one or more frequency bands, which together form an aggregate carrier, to transmit uplink data to the base station. Each of the component carriers can be associated with a certain bandwidth, such that the aggregate carrier can have a bandwidth associated with the combined bandwidth of the component carriers. Accordingly, in some situations, the overall bandwidth associated with uplink CA transmissions can be higher than the bandwidth of transmissions associated with a single carrier.

However, the UE may not have sufficient power to use both two-layer uplink and uplink CA at the same time. For example, to engage in two-layer uplink transmissions, the UE may split its available power among the two uplink layers. The UE may be unable to also engage in uplink CA transmissions in the individual uplink layers while the power is being split between the two uplink layers.

Some 5G UEs and 5G gNBs were initially deployed with support for two-layer uplink transmissions, but without support for uplink CA. For instance, gNBs may have initially supported 5G NR two-layer uplink transmissions while 5G NR uplink CA was still in development. However, as 5G NR uplink CA is deployed and gNBs are upgraded to support 5G NR uplink CA, some network operators are disabling the ability of gNBs and UEs to use 5G NR two-layer uplink transmissions. For example, because UEs may not have sufficient power to use two-layer uplink and uplink CA at the same time, some network operators may choose to configure UEs and/or base stations to use uplink CA and to disable two-layer uplink.

However, disabling two-layer uplink entirely, in favor of enabling uplink CA instead, can lead two-layer uplink to a loss of spectral efficiency benefits, improved uplink throughput, and other benefits that two-layer uplink can provide relative to uplink CA in some situations. For example, while uplink CA may provide benefits when a UE is at mid-cell and far-cell positions that are relatively far away from the base station, the UE may be able to achieve significantly higher uplink throughput at near-cell positions that are closer to the base station.

As a non-limiting example, at a near-cell position, the UE may be able to use two-layer uplink to transmit uplink data at a total of up to 160 Megabits per second (Mbps), based on two uplink layers transmitting at up to 80 Mbps each. However, if the UE were to use uplink CA at the same near-cell position, the UE 102 might achieve uplink transmissions of 80 Mbps in one component carrier and 20 to 40 Mbps in another component carrier, for a total of 100 to 120 Mbps. Accordingly, in this example, the UE may benefit from using two-layer uplink instead of uplink CA at the near-cell position.

The systems and methods described herein allow a base station to select whether a UE should use two-layer uplink or uplink CA, based on radio conditions reported by the UE. For instance, if the base station determines that the radio conditions reported by the UE indicate that UE would benefit from using two-layer uplink instead of uplink CA, the base station can instruct the UE to switch to using two-layer uplink. If instead the base station determines that the radio conditions reported by the UE indicate that UE would benefit from using uplink CA instead of two-layer uplink, the base station can instruct the UE to switch to using uplink CA. The base station can accordingly cause the UE to dynamically switch back and forth between using two-layer uplink and uplink CA, in response to the radio conditions reported by the UE.

Example Environment

FIG. 1 shows an example 100 of a network environment in which a UE 102 can connect to a base station 104 of a telecommunication network to engage in communication sessions for voice calls, video calls, messaging, data transfers, and/or any other type of communication. The UE 102 can be any device that can wirelessly connect to the base station 104. In some examples, the UE 102 can be a mobile phone, such as a smart phone or other cellular phone. In other examples, the UE 102 can be a personal digital assistant (PDA), a media player, a tablet computer, a gaming device, a smart watch, a hotspot, an Internet of Things (IoT) device, a personal computer (PC) such as a laptop, desktop, or workstation, or any other type of computing or communication device.

The base station 104 can be part of an access network, such as a RAN. The telecommunication network can also have a core network 106 linked to the access network. The UE 102 can wirelessly connect to the base station 104 of the access network, and in turn be connected to the core network 106 via the base station 104. The core network 106 can also link the UE 102 to an Internet Protocol (IP) Multimedia Subsystem (IMS), the Internet, and/or other networks.

The UE 102, the base station 104, other elements of the access network, and/or the core network 106 can be compatible with one or more radio access technologies, wireless access technologies, protocols, and/or standards. For example, the UE 102, the base station 104, and/or the core network 106 can support 5G NR technology, Long-Term Evolution (LTE)/LTE Advanced technology, other fourth generation (4G) technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMax® technology, WiFi® technology, and/or any other previous or future generation of radio access technology.

As an example, the base station 104 can be a gNB of a 5G access network. As another example, the access network can be an LTE access network, known as an Evolved UMTS Terrestrial Radio Access Network (E-UTRAN), and the base station 104 can be an evolved Node B (eNB) of the LTE access network. The core network 106 can also be based on LTE or 5G. For instance, the core network 106 can be a 5G core network or an LTE packet core network known as an Evolved Packet Core (EPC). The base station 104 and the core network 106 may be based on the same radio access technology or different radio access technologies. For instance, in some examples the base station 104 can be a 5G gNB that is linked to an LTE core network and/or a 5G core network.

The UE 102 can transmit data to, and/or receive data from, the base station 104. For example, the UE 102 can send uplink transmissions 108 to the base station 104 to upload data, submit requests for services, transmit voice and/or video data during calls, and/or to transmit any other type of data from the UE 102 to the base station 104, the core network 106, an IMS, the Internet, and/or other networks. The UE 102 can also receive downlink transmissions from the base station 104, for instance to download data, receive voice and/or video data during calls, and/or receive any other type of data.

In some examples, the UE 102 can have multiple antennas, such that the UE 102 can use multiple-input multiple-output (MIMO) techniques to exchange data with the base station 104 via different antennas. For example, the UE 102 can have a 2×2 MIMO configuration with two transmitter antennas and two receiver antennas, a 4×4 MIMO system with four transmitter antennas and four receiver antennas, or any other MIMO system.

The UE 102 and the base station 104 can support one or more frequency bands. Accordingly, the UE 102 can wirelessly connect to the base station 104 using one or more frequency bands supported by both the UE 102 and the base station 104. Such frequency bands can include frequency bands in low-band frequencies under 1 GHz, mid-band frequencies between 1 GHz and 6 GHz, and/or high-band frequencies above 6 GHz, such as millimeter wave (mmW) frequencies above 24 GHz.

Different frequency bands can support different duplexing schemes. For example, some frequency bands can support frequency division duplexing (FDD), while other frequency bands can support time division duplexing (TDD). FDD allows multiple transmissions to be sent at the same time using different frequencies, while TDD allows multiple transmissions to be sent at different times using the same frequency.

The UE 102 can support a two-layer uplink configuration 110 and an uplink CA configuration 112. The UE 102 can be configured to use either of the two-layer uplink configuration 110 or the uplink CA configuration 112 for uplink transmissions 108 at a particular time. However, the UE 102 can be configured to avoid using both the two-layer uplink configuration 110 and the uplink CA configuration 112 simultaneously. For example, the UE 102 may be configured to avoid using the two-layer uplink configuration 110 and the uplink CA configuration 112 simultaneously in order to preserve battery power of the UE 102.

When the UE 102 uses the two-layer uplink configuration 110, the UE 102 can transmit uplink transmissions 108 to the base station 104 using two uplink layers substantially simultaneously. In some examples, the two uplink layers can be associated with the same frequency band and/or the same duplexing scheme. For example, the two uplink layers can both be associated with a TDD band, or the two uplink layers can both be associated with an FDD band.

When the UE 102 uses the uplink CA configuration 112, the UE 102 can transmit uplink transmissions 108 to the base station using an aggregate carrier that includes multiple component carriers centered at frequencies within one or more frequency bands. For instance, the component carriers can span a contiguous range of frequencies in a single frequency band, be at non-contiguous frequency ranges in a single frequency band, or be at frequency ranges in multiple frequency bands. The component carriers of the aggregate carrier can be in one or more FDD bands, one or more TDD bands, or in a combination of FDD bands and TDD bands. In contrast to the two-layer uplink configuration 110 that uses two uplink layers for the uplink transmissions 108, the uplink CA configuration 112 can use a single uplink layer for the uplink transmissions 108.

The base station 104 can be configured to receive uplink transmissions 108 sent by the UE 102 using the two-layer uplink configuration 110 and the uplink CA configuration 112. For example, if the UE 102 is using the two-layer uplink configuration 110, the base station 104 can be configured to receive uplink data transmitted by the UE 102 via two uplink layers. If the UE 102 is instead using the uplink CA configuration 112, the base station 104 can be configured to receive uplink data transmitted by the UE 102 via multiple component carriers in a single uplink layer.

The two-layer uplink configuration 110 and the uplink CA configuration 112 can offer various advantages and disadvantages relative to one another. For example, if the UE 102 is located at a near-cell position that is relatively close to the base station 104 and signal strengths between the UE 102 and the base station 104 are relatively strong, the two-layer uplink configuration 110 may provide higher throughput values for the uplink transmissions 108 than the uplink CA configuration 112, and/or may provide improved spectral efficiency than the uplink CA configuration 112. As a non-limiting example, if the UE 102 could use a single uplink layer in a TDD band to transmit the uplink transmissions 108 to the base station 104 at up to 80 Megabits per second (Mbps), the UE 102 may be able to double the uplink data transmission speeds to up to 160 Mbps by using two uplink layers in the TDD band and transmitting uplink data at up to 80 Mbps in each of the two uplink layers. The two-layer uplink configuration 110 can also improve spectral deficiency, as the UE 102 may be able to re-use the same spectrum or radio resources allocated to the UE 102 for both of the uplink layers used for uplink transmissions 108.

However, if the UE 102 is at a mid-cell position or a far-cell position that is farther away from the base station 104, and/or if signal strengths between the UE 102 and the base station 104 are relatively poor, the uplink CA configuration 112 may provide higher bandwidth, higher throughput, less power usage, and/or other benefits than the two-layer uplink configuration 110. For instance, if the UE 102 is relatively far away from the base station 104, the UE 102 may be able to transmit the uplink transmissions 108 more quickly and/or with the use of less power via a single uplink layer using the uplink CA configuration 112, relative to transmitting the uplink transmissions 108 via two uplink layers using the two-layer uplink configuration 110.

Accordingly, the base station 104 can be configured to dynamically instruct the UE 102 to use either the two-layer uplink configuration 110 or the uplink CA configuration 112 for uplink transmissions 108, based on information provided by the UE 102 in a UE report 114. The UE report 114 can include information that directly or indirectly indicates a signal strength associated with a connection between the UE 102 and the base station 104, a position of the UE 102 relative to the base station 104, and/or other information. The base station 104 can be configured with two-layer uplink criteria 116, as discussed further below. If data indicated by the UE report 114 satisfies the two-layer uplink criteria 116, the base station 104 can send an uplink configuration instruction 118 to the UE 102 that instructs the UE 102 to use the two-layer uplink configuration 110 for the uplink transmissions 108. If data indicated by the UE report 114 does not satisfy the two-layer uplink criteria 116, the uplink configuration instruction 118 sent by the base station 104 to the UE 102 can instead instruct the UE 102 to use the uplink CA configuration 112 for the uplink transmissions 108, instead of the two-layer uplink configuration 110.

The UE 102 can be configured to determine radio condition metrics 120, such as signal strength measurements, signal quality measurements, and/or other types of metrics or key performance indicators (KPIs) associated with radio conditions between the UE 102 and the base station 104. For example, based on a reference signal or other signals received from the base station 104, the UE 102 can measure one or more types of radio condition metrics 120, such as a received signal strength indicator (RSSI), a reference signal received power (RSRP), a reference signal received quality (RSRQ), and/or other measurements. Based on such measurements, the UE 102 can also determine other types of radio condition metrics 120, such as a signal to noise ratio (SNR), a signal to interference and noise ratio (SINR), a signal to noise and distortion ration (SNDR), a block error rate (BLER), and/or other types of metrics.

The radio condition metrics 120 can, in some examples, include a channel quality indicator (CQI) value. A CQI value can indicate a quality level associated with a connection between the UE 102 and the base station 104. CQI values can also be associated with a modulation and coding scheme (MCS), such as quadrature phase shift keying (QPSK), 16 quadrature amplitude modulation (QAM), 64 QAM, 256 QAM, or other MCS types, and/or other types of data.

In some examples, the UE 102 can have a CQI model 122 that the UE 102 can use to determine or derive a CQI value based on other radio condition metrics 120 and/or other data. For example, the CQI model 122 can be table that maps one or more values, such as SINR values, SNR values, SNDR values, BLER values, RSSI values, RSRP values, RSRQ values, and/or other values, to CQI values.

The UE 102 can, periodically or aperiodically, send the UE report 114 to the base station 104. The UE 102 can send the UE report 114 to the base station 104 on a periodic basis, on an occasional basis, in response to a request from the base station 104, or based on any other event or schedule. The UE report 114 can directly or indirectly indicate one or more of the radio condition metrics 120 determined by the UE 102.

As an example, the UE report 114 can be a CQI report that indicates the CQI value determined by the UE 102 and/or other radio condition metrics 120. As another example, the UE report 114 can be a Channel State Information (CSI) report that includes the CQI value determined by the UE 102, other radio condition metrics 120, a precoding matrix indicator (PMI), a rank indicator (RI), and/or other information.

As discussed above, in some examples the UE report 114 can indicate a CQI value determined by the UE 102 based on one or more other radio condition metrics 120 determined by the UE 102. For example, if the UE 102 is configured to measure RSSI, RSRP, and/or RSRQ values, to determine a SINR value from the measured RSSI, RSRP, and/or RSRQ values, and to use the CQI model 122 to determine a CQI value based on one or more of the SINR, RSSI, RSRP, and/or RSRQ values, the UE report 114 sent by the UE 102 may indicate the CQI value but omit the SINR, RSSI, RSRP, and/or RSRQ values.

In these examples, the base station 104 may be provisioned with a copy of the CQI model 122 used by the UE 102. Accordingly, based on the CQI value provided by the UE 102 in the UE report 114, the base station 104 can use the CQI model 122 to determine or estimate one or more types of radio condition metrics 120 that the UE 102 used to determine the CQI value. For example, although the UE 102 may have omitted SINR, RSSI, RSRP, and/or RSRQ values from the UE report 114, the base station 104 can use the CQI model 122 to determine SINR, RSSI, RSRP, and/or RSRQ values, or ranges of SINR, RSSI, RSRP, and/or RSRQ values, that map to a CQI value that was provided in the UE report 114.

Different UEs may, in some examples, be configured to use different CQI models to generate CQI values from the same or different types of radio condition metrics 120. Accordingly, the base station 104 can be provisioned with multiple CQI models, such that the base station 104 can select and use CQI models that correspond to different types of UEs that submit UE reports to the base station 104.

Although the base station 104 can, in some examples, be configured to use the CQI model 122 to derive other types of radio condition metrics 120 from a CQI value provided in the UE report 114, in other examples the UE report 114 can directly include one or more other types of radio condition metrics 120 determined by the UE 102. For example, the UE report 114 can directly indicate SINR values, SNR values, SNDR values, BLER values, RSSI values, RSRP values, RSRQ values, and/or other values determined by the UE 102 instead of, or in addition to, a CQI value.

The base station 104 can accordingly identify, determine, or estimate one or more types of radio condition metrics 120 that are directly or indirectly indicated by the UE report 114. The base station 104 can compare the radio condition metrics 120 against the two-layer uplink criteria 116 to determine whether the UE 102 should be using the two-layer uplink configuration 110 or the uplink CA configuration 112.

The two-layer uplink criteria 116 can indicate conditions and/or one or more threshold values that indicate whether the UE 102 should be using the two-layer uplink configuration 110 or the uplink CA configuration 112. In some examples, the two-layer uplink criteria 116 can indicate a trigger condition or one or more threshold values that indicate that the UE 102 should switch from using the two-layer uplink configuration 110 to using the uplink CA configuration 112, or alternately should switch from using the uplink CA configuration 112 to using the two-layer uplink configuration 110.

The two-layer uplink criteria 116 can be associated with one or more types of radio condition metrics 120. As a first example, the two-layer uplink criteria 116 can indicate a threshold CQI value. In this example, if a CQI value indicated in the UE report 114 is at or above the threshold CQI value, the base station 104 can determine that the UE 102 should use the two-layer uplink configuration 110. However, if the CQI value indicated in the UE report 114 is below the threshold CQI value, the base station 104 can determine that the UE 102 should use the uplink CA configuration 112.

As a second example, the two-layer uplink criteria 116 can indicate a threshold RSRP value, such as −90 decibel-milliwatts (dBm) or any other threshold RSRP value. The UE report 114 can directly indicate an RSRP value measured by the UE 102, or the base station can estimate or derive the RSRP value measured by the UE 102 from a CQI value and/or other data included in the UE report 114. Accordingly, in this example, if the RSRP value that is directly or indirectly indicated by the UE report 114 is at or above the threshold RSRP value, the base station 104 can determine that the UE 102 should use the two-layer uplink configuration 110. However, if the RSRP value that is directly or indirectly indicated by the UE report 114 is below the threshold RSRP value, the base station 104 can determine that the UE 102 should use the uplink CA configuration 112.

As a third example, the two-layer uplink criteria 116 can indicate a threshold SINR value, such as 0 dB, 5 dB, 10 dB, or any other threshold SINR value. The UE report 114 can directly indicate a SINR value determined by the UE 102, or the base station can estimate or derive the SINR value determined by the UE 102 from a CQI value and/or other data included in the UE report 114. Accordingly, in this example, if the SINR value that is directly or indirectly indicated by the UE report 114 is at or above the threshold SINR value, the base station 104 can determine that the UE 102 should use the two-layer uplink configuration 110. However, if the SINR value that is directly or indirectly indicated by the UE report 114 is below the threshold SINR value, the base station 104 can determine that the UE 102 should use the uplink CA configuration 112.

In some examples, the two-layer uplink criteria 116 can be based on a single type of radio condition metric, such as a threshold CQI value, a threshold RSRP value, a threshold RSRQ value, threshold SINR value, or any other type of threshold value as discussed above. However, in other examples, the two-layer uplink criteria 116 can be based on a combination of two or more types of radio condition metrics 120. As a non-limiting example, the two-layer uplink criteria 116 can indicate that, for the base station 104 to determine that the UE 102 should use the two-layer uplink criteria 116, a SINR value determined from the UE report 114 should be at least 15 dB and an RSRQ value determined from the UE report 114 should be at least −10 dB. The two-layer uplink criteria 116 can also, in some examples, indicate weights associated with different types of radio condition metrics 120, such that the two-layer uplink criteria 116 is based on a weighted combination of multiple radio condition metrics 120.

Overall, if the base station 104 determines that radio condition metrics 120 directly or indirectly indicated by the UE report 114 satisfy the two-layer uplink criteria 116, the base station 104 can determine that the UE 102 should use the two-layer uplink configuration 110. However, if the base station 104 determines that radio condition metrics 120 directly or indirectly indicated by the UE report 114 do not satisfy the two-layer uplink criteria 116, the base station 104 can determine that the UE 102 should use the uplink CA configuration 112.

Accordingly, based on a determination of whether the UE 102 should use the two-layer uplink configuration 110 or the uplink CA configuration 112, the base station 104 can send the uplink configuration instruction 118 to the UE 102. For example, if the base station 104 determines that the radio condition metrics 120 indicated by the UE report 114 satisfy the two-layer uplink criteria 116, the uplink configuration instruction 118 can instruct the UE 102 to use the two-layer uplink configuration 110. If the base station 104 instead determines that the radio condition metrics 120 indicated by the UE report 114 do not satisfy the two-layer uplink criteria 116, the uplink configuration instruction 118 can instruct the UE 102 to use the uplink CA configuration 112.

In some examples, the base station 104 can send the uplink configuration instruction 118 to the UE 102 when the base station 104 determines that the UE 102 should switch from using the two-layer uplink configuration 110 to using the uplink CA configuration 112, or should switch from using the uplink CA configuration 112 to using the two-layer uplink configuration 110. For example, if the base station 104 determines that the UE 102 should use the two-layer uplink configuration 110, and the UE 102 is already using the two-layer uplink configuration 110, the base station 104 may avoid sending the uplink configuration instruction 118 to the UE 102. However, if the base station 104 determines that the UE 102 should use the two-layer uplink configuration 110, and the UE 102 is currently using the uplink CA configuration 112, the base station 104 can send the uplink configuration instruction 118 to the UE 102 to instruct the UE 102 to change from using the uplink CA configuration 112 to using the two-layer uplink configuration 110.

The base station 104 can have a UE uplink configuration database 124 that tracks whether the UE 102, and/or other UEs connected to the base station 104, are using the two-layer uplink configuration 110 or the uplink CA configuration 112. The base station 104 can, in some examples, update the UE uplink configuration database 124 when the base station 104 instructs a UE to use either the two-layer uplink configuration 110 or the uplink CA configuration 112, or instructs a UE to switch between the two-layer uplink configuration 110 and the uplink CA configuration 112. Accordingly, the base station 104 can use the UE uplink configuration database 124 to determine whether the UE 102 is currently using a first one of the two-layer uplink configuration 110 or the uplink CA configuration 112, and whether the base station 104 should send the uplink configuration instruction 118 to instruct the UE 102 to change to a second one of the two-layer uplink configuration 110 or the uplink CA configuration 112.

In some examples, the uplink configuration instruction 118 can be a Radio Resource Control (RRC) message, such as an RRC reconfiguration message. For example, the uplink configuration instruction 118 can be an RRC reconfiguration message that includes a header value, body data, and/or one or more other types of data that instructs the UE 102 to use a particular one of the two-layer uplink configuration 110 or the uplink CA configuration 112 selected by the base station 104, that instructs the UE 102 to switch from using the two-layer uplink configuration 110 to using the uplink CA configuration 112, or that instructs the UE 102 to switch from using the uplink CA configuration 112 to using the two-layer uplink configuration 110.

The uplink configuration instruction 118 can include multiple messages in some examples. For instance, if the base station 104 determines that the UE 102 should switch from using the two-layer uplink configuration 110 to using the uplink CA configuration 112, the base station 104 can send a first RRC reconfiguration message to the UE 102 that instructs the UE 102 to release the two uplink layers the UE 102 may currently be using for uplink transmissions 108 according to the two-layer uplink configuration 110. The base station 104 can also send a second RRC reconfiguration message to the UE 102 that instructs the UE 102 to start using the uplink CA configuration 112 for the uplink transmissions 108. In some examples, the second RRC reconfiguration message may indicate frequencies allocated by the base station 104 to the UE 102 for component carriers, or instruct the UE 102 to perform other operations to set up component carriers for the uplink transmissions 108.

As shown in FIG. 1, although the UE 102 can determine radio condition metrics 120, and can directly or indirectly indicate the radio condition metrics 120 to the base station 104, the base station 104 can compare one or more types of radio condition metrics 120 against the two-layer uplink criteria 116 to determine whether the UE 102 should use the two-layer uplink configuration 110 or the uplink CA configuration 112 for uplink transmissions 108 to the base station 104. The base station 104 can be configured with the two-layer uplink criteria 116 by a network operator, RAN vendor, or other entity, as discussed further below with respect to FIG. 2.

Figure 2:
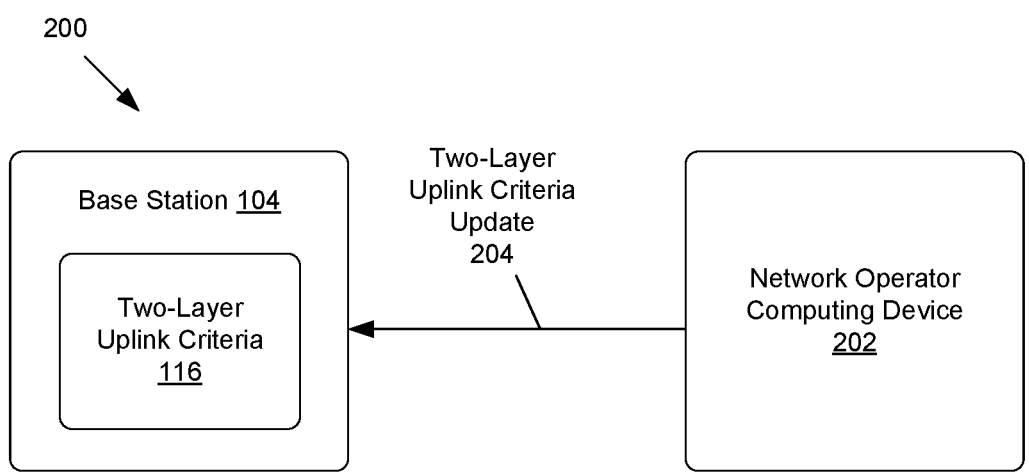
FIG. 2 shows an example of a network operator computing device providing a two-layer uplink criteria update to the base station.

FIG. 2 shows an example 200 of a network operator computing device 202 providing a two-layer uplink criteria update 204 to the base station 104. As discussed above, the base station 104 can have two-layer uplink criteria 116 that indicates conditions in which a UE, such as UE 102, should use the two-layer uplink configuration 110 for uplink transmissions 108 instead of the uplink CA configuration 112.

The two-layer uplink criteria 116 used by the base station 104 can be configured by a network operator, RAN vendor, or any other entity. For example, the network operator computing device 202 can be associated with a network operator, RAN vendor, or any other entity, and can be used to transfer the two-layer uplink criteria update 204 to the base station 104 through a wired or wireless connection. The two-layer uplink criteria update 204 can be a configuration file or other data that indicates a new version of the two-layer uplink criteria 116 or indicates one or more changes to a previous version of the two-layer uplink criteria 116. Accordingly, the base station 104 can replace or update the two-layer uplink criteria 116 based on the two-layer uplink criteria update 204.

The two-layer uplink criteria update 204 can change threshold values used in the two-layer uplink criteria 116, change from one type of threshold value to a different type of threshold value, add or adjust a combination of threshold values, change weights associated with a weighted combination of threshold values, and/or otherwise adjust the two-layer uplink criteria 116. As a non-limiting example, the two-layer uplink criteria 116 may initially indicate that a UE 102 should use the two-layer uplink configuration 110 for uplink transmissions 108, instead of the uplink CA configuration 112, if a SINR value indicated by a UE report is at least 5 dB. However, a network operator may perform testing over a period of time and determine that the two-layer uplink configuration 110 leads to better bandwidth, throughput, and/or other uplink transmission attributes than the uplink CA configuration 112 when SINR values are at least 10 dB, and that the uplink CA configuration 112 leads to better bandwidth, throughput, and/or other uplink transmission attributes when SINR values are lower than 10 dB. Accordingly, the two-layer uplink criteria update 204 can change a SINR threshold value in the two-layer uplink criteria 116 used by the base station 104 from 5 dB to 10 dB.

In some examples, a network operator, RAN vendor, or other entity can cause different base stations to use different two-layer uplink criteria. For instance, based on geography, building layouts, and/or other factors associated with different cells, a network operator may configure a first base station associated with a first cell to use first two-layer uplink criteria, but configure a second base station associated with a second cell to use second two-layer uplink criteria that differs from the first two-layer uplink criteria.

As a non-limiting example, testing may indicate that, in a first cell, a threshold RSRP value of −80 dBm indicates that a UE is likely to achieve higher uplink throughput by using the two-layer uplink configuration 110 than by using the uplink CA configuration 112. However, testing may also indicate that, in a second cell, a threshold RSRP value of −95 dBm indicates that a UE is likely to achieve higher uplink throughput by using the two-layer uplink configuration 110 than by using the uplink CA configuration 112. Accordingly, based on testing associated with the first cell and the second cell, a network operator may configure a first base station of the first cell to use first two-layer uplink criteria associated with the −80 dBm threshold RSRP value, and configure a second base station of the second cell to use second two-layer uplink criteria associated with the −95 dBm threshold RSRP value.

As another non-limiting example, testing in a first cell may indicate that a threshold SINR value is likelier than a threshold RSRP value to indicate whether a UE can achieve higher uplink throughput by using the two-layer uplink configuration 110 than by using the uplink CA configuration 112. However, testing in a second cell may indicate that a threshold RSRP value is likelier than a threshold SINR value to indicate whether a UE can achieve higher uplink throughput by using the two-layer uplink configuration 110 than by using the uplink CA configuration 112. Accordingly, based on testing associated with the first cell and the second cell, a network operator may configure a first base station of the first cell to use first two-layer uplink criteria associated with a threshold SINR value, and configure a second base station of the second cell to use second two-layer uplink criteria associated with threshold RSRP value.

Example Architecture

Figure 3:
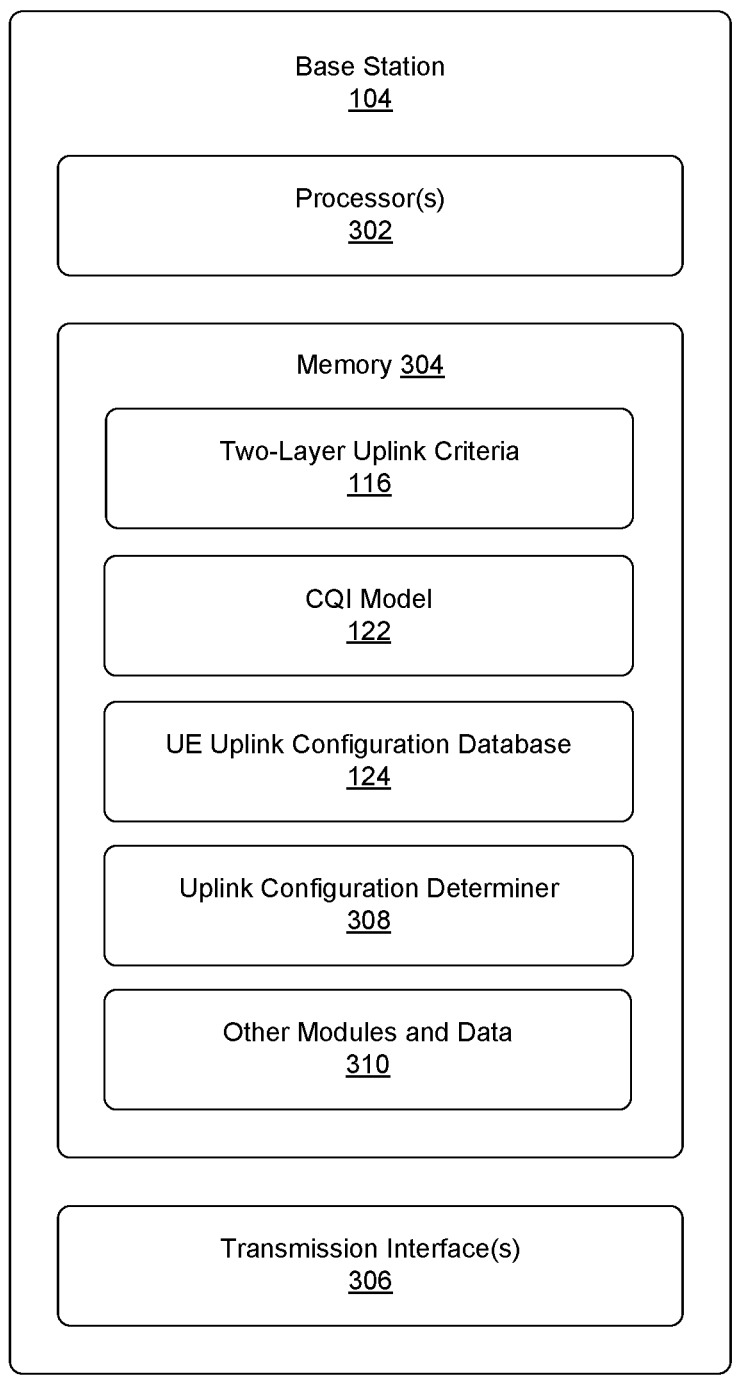
FIG. 3 shows an example of a system architecture for the base station.

FIG. 3 shows an example 300 of a system architecture for the base station 104, in accordance with various examples. As discussed above, the base station 104 can be a 5G gNB.

As shown, the base station 104 can include processor(s) 302, memory 304, and transmission interfaces 306.

The processor(s) 302 may be a CPU or any other type of processing unit. Each of the one or more processor(s) 302 may have numerous ALUs that perform arithmetic and logical operations, as well as one or more CUs that extract instructions and stored content from processor cache memory, and then executes these instructions by calling on the ALUs, as necessary, during program execution. The processor(s) 302 may also be responsible for executing all computer-executable instructions and/or computer applications stored in the memory 304.

In various examples, the memory 304 can include system memory, which may be volatile (such as RAM), non-volatile (such as ROM, flash memory, etc.) or some combination of the two. The memory 304 can also include additional data storage devices (removable and/or non-removable) such as, for example, magnetic disks, optical disks, or tape. Memory 304 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, DVD, or other optical storage, magnetic cassettes, magnetic tape, magnetic disk storage or other magnetic storage devices, or any other non-transitory medium which can be used to store the desired information and which can be accessed by the base station 104. Any such non-transitory computer-readable media may be part of the base station 104.

The memory 304 can store computer-readable instructions and/or other data associated with operations of the base station 104. For example, the memory 304 can store the two-layer uplink criteria 116, the CQI model 122, and/or the UE uplink configuration database 124 discussed above. The memory 304 can also store computer-executable instructions associated with an uplink configuration determiner 308. The uplink configuration determiner 308 can be configured to determine one or more radio condition metrics 120 indicted, directly or indirectly, by the report 114. For example, the uplink configuration determiner 308 can use the CQI model 122 to determine or estimate one or more types of radio condition metrics 120 based on a CQI value included in the UE report 114. The uplink configuration determiner 308 also be configured to determine whether the one or more radio condition metrics 120 satisfy the two-layer uplink criteria 116, and thus to determine whether to send the uplink configuration instruction 118 to the UE. The memory 304 can also store other modules and data 310. The other modules and data 310 can be utilized by the base station 104 to perform or enable performing any action taken by the base station 104. The other modules and data 310 can include a platform, operating system, firmware, and/or applications, and data utilized by the platform, operating system, firmware, and/or applications.

The transmission interfaces 306 can include one or more modems, receivers, transmitters, antennas, error correction units, symbol coders and decoders, processors, chips, application specific integrated circuits (ASICs), programmable circuit (e.g., field programmable gate arrays), firmware components, and/or other components that can establish connections with the UE 102, other base stations or RAN elements, elements of the core network 106, and/or other network elements, and can transmit data over such connections. For example, the transmission interfaces 306 can establish a connection with the UE 102 over an air interface. The transmission interfaces 306 can also support transmissions using one or more radio access technologies, such as 5G NR. The transmission interfaces 306 can also be used by the base station 104 to receive the uplink transmissions 108 from the UE 102, to receive the UE report 114 from the UE 102, and to send the uplink configuration instruction 118 to the UE 102.

Example Operations

Figure 4:
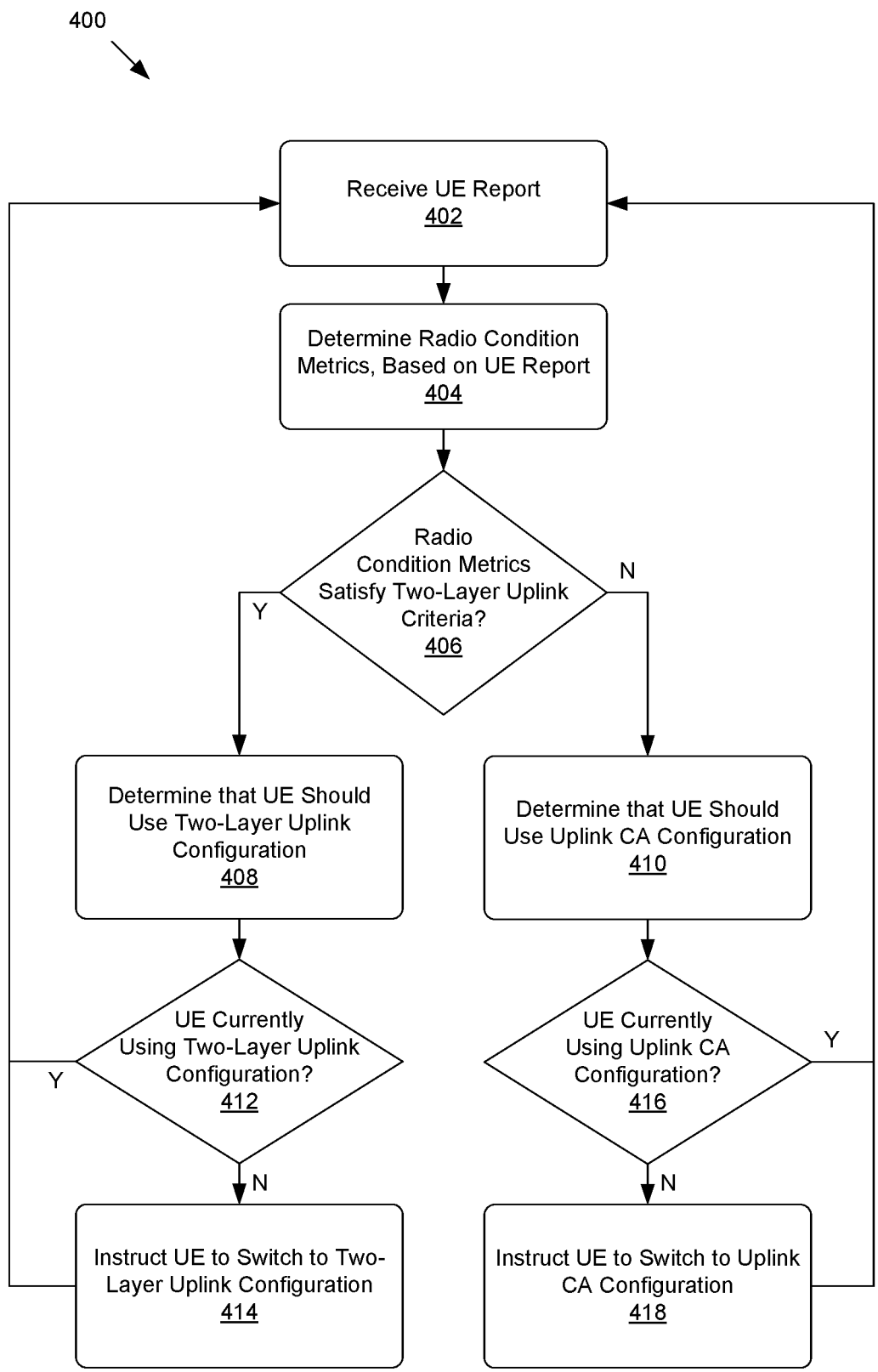
FIG. 4 shows a flowchart of an example method by which the base station can determine whether to instruct the UE to switch between using a two-layer uplink configuration and an uplink CA configuration.

FIG. 4 shows a flowchart of an example method 400 by which the base station 104 can determine whether to instruct the UE 102 to switch between using the two-layer uplink configuration 110 and the uplink CA configuration 112. At block 402, the base station 104 can receive the UE report 114 from the UE 102. The UE report 114 can be a CQI report, a CSI report, or any other type of report that includes one or more types of information determined by the UE 102 about a connection between the UE 102 and the base station 104.

At block 404, the base station 104 can determine one or more radio condition metrics 120 indicated by the UE report 114 received at block 402. In some examples, the UE report 114 can directly include one or more types of radio condition metrics 120 that were determined by the UE 102, such as a CQI value, a SINR value, a RSRP value, an RSRQ value, and/or values of other types of radio condition metrics 120.

In other examples, the UE report 114 can directly include radio condition metrics 120 that allow the base station 104 to determine, derive, or estimate other radio condition metrics 120 that the UE 102 did not include in the UE report 114. For example, the UE report 114 can indicate a CQI value, but omit other values such as a SINR value, a RSRP value, an RSRQ value, and/or values of other types of radio condition metrics 120. In this example, the base station 104 can use the CQI model 122 associated with the UE 102 to estimate or derive the values of one or more types of radio condition metrics 120 based on the CQI value directly indicated in the UE report 114. For example, the base station 104 can use the CQI model 122 to determine a SINR value, an RSSI value, an RSRP value, a RSRQ value, and/or values of other types of radio condition metrics 120, or ranges of such values, that map to the CQI value provided in the UE report 114.

In some examples, the base station 104 can determine one or more specific types of radio condition metrics 120, indicated by the UE report 114, that correspond to the threshold values or other types of values indicated in the two-layer uplink criteria 116 at block 404. For example, if the two-layer uplink criteria 116 is based on a threshold SINR value, at block 404 the base station 104 can identify a SINR value included within the UE report 114 or derive a SINR value that is indirectly indicated by one or more other values included within the UE report 114.

At block 406, the base station 104 can determine whether the one or more radio condition metrics 120 determined at block 404 satisfy the two-layer uplink criteria 116. For example, if the two-layer uplink criteria 116 is satisfied when a value of a particular type of radio condition metric is at or above a threshold value, the base station 104 can determine whether a value of that type of radio condition metric, indicated by the UE report 114, is at or above the threshold value indicated by the two-layer uplink criteria 116.

If the base station 104 determines that the radio condition metrics 120 determined at block 404 satisfy the two-layer uplink criteria 116 (Block 406—Yes), the base station 104 can determine at block 408 that the UE 102 should use the two-layer uplink configuration 110 for uplink transmissions 108 to the base station 104. If the base station 104 instead determines that the radio condition metrics 120 determined at block 404 do not satisfy the two-layer uplink criteria 116 (Block 406—No), the base station 104 can determine at block 410 that the UE 102 should use the uplink CA configuration 112 for uplink transmissions 108 to the base station 104.

If the base station 104 determines at block 408 that the UE 102 should use the two-layer uplink configuration 110 for uplink transmissions 108 to the base station 104, the base station 104 can also determine at block 412 whether the UE 102 is already currently using the two-layer uplink configuration 110. For example, the base station 104 can use the UE uplink configuration database 124 to determine whether the base station 104 most recently instructed the UE 102 to use the two-layer uplink configuration 110. If the base station 104 determines that the UE 102 is already currently using the two-layer uplink configuration 110 (Block 412—Yes), the base station 104 can wait to receive the next UE report 114 from the UE 102 at block 402.

However, if the base station 104 determines that the UE 102 is not currently using the two-layer uplink configuration 110 (Block 412—No), for instance because the UE 102 is currently using the uplink CA configuration 112, the base station 104 can instruct the UE 102 at block 414 to switch to using the two-layer uplink configuration 110. For example, at block 414 the base station 104 can send the uplink configuration instruction 118 to instruct the UE 102 to use the two-layer uplink configuration 110 for uplink transmissions 108. After instructing the UE 102 use the two-layer uplink configuration 110 for uplink transmissions 108 at block 414, the base station 104 can wait to receive the next UE report 114 from the UE 102 at block 402.

If the base station 104 instead determines at block 410 that the UE 102 should use the uplink CA configuration 112 for uplink transmissions 108 to the base station 104, the base station 104 can determine at block 416 whether the UE 102 is already currently using the uplink CA configuration 112. For example, the base station 104 can use the UE uplink configuration database 124 to determine whether the base station 104 most recently instructed the UE 102 to use the uplink CA configuration 112. If the base station 104 determines that the UE 102 is already currently using the uplink CA configuration 112 (Block 416—Yes), the base station 104 can wait to receive the next. UE report 114 from the UE 102 at block 402.

However, if the base station 104 determines that the UE 102 is not currently using the uplink CA configuration 112 (Block 416—No), for instance because the UE 102 is currently using the two-layer uplink configuration 110, the base station 104 can instruct the UE 102 at block 418 to switch to using the uplink CA configuration 112. For example, at block 418 the base station 104 can send the uplink configuration instruction 118 to instruct the UE 102 to use the uplink CA configuration 112 for uplink transmissions 108. After instructing the UE 102 use the uplink CA configuration 112 for uplink transmissions 108 at block 418, the base station 104 can wait to receive the next UE report 114 from the UE 102 at block 402.

Accordingly, as shown in FIG. 4, the base station 104 can instruct the UE 102 to dynamically switch back and forth between using the two-layer uplink configuration 110 and using the uplink CA configuration 112 for uplink transmissions 108. For example, because the UE 102 may move, and/or radio conditions may change, between times at which the UE 102 sends UE reports to the base station 104, the radio condition metrics 120 indicated by different UE reports received from the same UE over time may vary. As such, the base station 104 may cause the UE 102 to dynamically change between using the two-layer uplink configuration 110 and using the uplink CA configuration 112, based on whether the most recent UE report indicates one or more radio condition metrics 120 that satisfy the two-layer uplink criteria 116.

As an example, a first UE report received by the base station 104 from the UE 102 at a first time may directly or indirectly indicate that a value of a radio condition metric is above a corresponding threshold value indicated by the two-layer uplink criteria 116. Accordingly, because the value of the radio condition metric satisfies the two-layer uplink criteria 116 at the first time, the base station 104 can instruct the UE 102 to use the two-layer uplink configuration 110. In this situation, because the value of the radio condition metric satisfies the two-layer uplink criteria 116, use of the two-layer uplink configuration 110 may provide the UE 102 improved uplink throughput, uplink bandwidth, and/or other uplink attributes to relative to using the uplink CA configuration 112.

However, a second UE report received by the base station 104 from the UE 102 at a second time may indicate that the same radio condition metric has fallen to a value that is below the corresponding threshold value indicated by the two-layer uplink criteria 116. The change in the value of the radio condition metric may be because the UE 102 has moved farther away from the base station 104, because of an increased level of interference or another change in radio conditions, and/or for any other reason. Accordingly, because the value radio condition metric does not satisfy the two-layer uplink criteria 116 at the second time, the base station 104 can instruct the UE 102 to change from using the two-layer uplink configuration 110 to using the uplink CA configuration 112. In this situation, because the value radio condition metric does not satisfy the two-layer uplink criteria 116, use of the uplink CA configuration 112 may provide the UE 102 improved uplink throughput, uplink bandwidth, and/or other uplink attributes to relative to using the two-layer uplink configuration 110.

At a third time, the UE 102 may send a subsequent UE report that indicates that the value of the radio condition metric has again risen to be equal to or above the corresponding threshold value indicated by the two-layer uplink criteria 116. The value of the radio condition metric may have increased because the UE 102 has moved closer to the base station 104, because of a reduced level of interference, and/or for any another reason. Accordingly, because the value radio condition metric again satisfies the two-layer uplink criteria 116 at the third time, the base station 104 can instruct the UE 102 to change from using the uplink CA configuration 112 to using the two-layer uplink configuration 110. In this situation, because the value of the radio condition metric satisfies the two-layer uplink criteria 116, use of the two-layer uplink configuration 110 may provide the UE 102 improved uplink throughput, uplink bandwidth, and/or other uplink attributes to relative to using the uplink CA configuration 112.

Conclusion

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method, comprising:
receiving, by a base station of a telecommunication network, a user equipment (UE) report from a UE, wherein the UE report includes a radio condition metric and a position of the UE relative to the base station;
determining, by the base station, the radio condition metric and the position indicated by the UE report;
determining, by the base station, that the radio condition metric and the position indicated by the UE report satisfy a two-layer uplink criteria for the UE to use a two-layer uplink configuration instead of an uplink carrier aggregation (CA) configuration for uplink transmissions to the base station;
determining, by the base station, that the UE is currently using the uplink CA configuration; and
instructing, by the base station, the UE to switch from using the uplink CA configuration to using the two-layer uplink configuration for the uplink transmissions.

2. The method of claim 1, further comprising:
receiving, by the base station, a second UE report from the UE;
determining, by the base station, a second radio condition metric and second position indicated by the second UE report;
determining, by the base station, that the second radio condition metric and the second position indicated by the second UE report do not satisfy the two-layer uplink criteria for the UE to use the two-layer uplink configuration instead of the uplink CA configuration;
determining, by the base station, that the UE is currently using the two-layer uplink configuration; and
instructing, by the base station, the UE to switch from using the two-layer uplink configuration to using the uplink CA configuration for the uplink transmissions.

3. The method of claim 1, wherein the radio condition metric includes at least one of:
a signal to interference and noise ratio (SINR) value,
a signal to noise and distortion ration (SNDR) value,
a block error rate (BLER) value,
a received signal strength indicator (RSSI) value,
a reference signal received power (RSRP) value,
a reference signal received quality (RSRQ) value, or
a channel quality indicator (CQI) value.

4. The method of claim 1, wherein the radio condition metric is directly indicated in the UE report.

5. The method of claim 1, further comprising:
identifying, by the base station, a value included directly within the UE report; and
deriving, by the base station, the radio condition metric based on the value included directly within the UE report.

6. The method of claim 5, wherein the value is a channel quality indicator (CQI) value, and the base station uses a CQI model associated with the UE to derive the radio condition metric from the CQI value.

7. The method of claim 1, wherein the two-layer uplink criteria indicates:
a threshold value associated with the radio condition metric,
that the UE is to use the two-layer uplink configuration based on a value of the radio condition metric being equal to or higher than the threshold value, and
that the UE is to use the uplink CA configuration based on the value of the radio condition metric being less than the threshold value.

8. The method of claim 1, further comprising:
receiving, by the base station, an update to the two-layer uplink criteria from a network operator computing device; and
adjusting, by the base station, the two-layer uplink criteria based on the update,
wherein the update indicates a change to a type of the radio condition metric or a threshold value of the radio condition metric associated with the two-layer uplink criteria.

9. A base station of a telecommunication network, comprising:
one or more processors; and
memory storing computer-executable instructions that, when executed by the one or more processors, cause the one or more processors to perform operations comprising:
receiving, from a user equipment (UE), a UE report, wherein the UE report includes a radio condition metric and a position of the UE relative to the base station;
determining the radio condition metric and the position indicated by the UE report;
determining whether the radio condition metric and the position indicated by the UE report satisfy a two-layer uplink criteria;
based on determining that the radio condition metric and the position satisfy the two-layer uplink criteria, causing the UE to use a two-layer uplink configuration instead of an uplink carrier aggregation (CA) configuration for uplink transmissions to the base station; and
based on determining that the radio condition metric and the position do not satisfy the two-layer uplink criteria, causing the UE to use the uplink CA configuration instead of the two-layer uplink configuration for the uplink transmissions to the base station.

10. The base station of claim 9, wherein the radio condition metric includes least one of:
a signal to interference and noise ratio (SINR) value,
a signal to noise and distortion ration (SNDR) value,
a block error rate (BLER) value,
a received signal strength indicator (RSSI) value,
a reference signal received power (RSRP) value,
a reference signal received quality (RSRQ) value, or
a channel quality indicator (CQI) value.

11. The base station of claim 9, wherein the radio condition metric is directly indicated in the UE report.

12. The base station of claim 9, wherein the operations further comprise:
identifying a value included directly within the UE report; and
deriving the radio condition metric based on the value included directly within the UE report.

13. The base station of claim 9, wherein the two-layer uplink criteria is stored in the memory, and the two-layer uplink criteria indicates:
a threshold value associated with the radio condition metric,
that the UE is to use the two-layer uplink configuration based on a value of the radio condition metric being equal to or higher than the threshold value, and that the UE is to use the uplink CA configuration based on the value of the radio condition metric being less than the threshold value.

14. The base station of claim 9, wherein the two-layer uplink criteria is stored in the memory, and the operations further comprise:
   receiving an update to the two-layer uplink criteria from a network operator computing device; and
   adjusting the two-layer uplink criteria based on the update,
   wherein the update indicates a change to a type of the radio condition metric or a threshold value of the radio condition metric associated with the two-layer uplink criteria.

15. One or more non-transitory computer-readable media storing computer-executable instructions that, when executed by one or more processors of a base station of a telecommunication network, cause the one or more processors to perform operations comprising:
   receiving, from a user equipment (UE), a UE report, wherein the UE report includes a radio condition metric and a position of the UE relative to the base station;
   determining the radio condition metric and the position indicated by the UE report;
   determining whether the radio condition metric and the position indicated by the UE report satisfy a two-layer uplink criteria;
   based on determining that the radio condition metric and the position satisfy the two-layer uplink criteria, causing the UE to use a two-layer uplink configuration instead of an uplink carrier aggregation (CA) configuration for uplink transmissions to the base station; and
   based on determining that the radio condition metric and the position do not satisfy the two-layer uplink criteria, causing the UE to use the uplink CA configuration instead of the two-layer uplink configuration for the uplink transmissions to the base station.

16. The one or more non-transitory computer-readable media of claim 15, wherein the radio condition metric includes at least one of:
   a signal to interference and noise ratio (SINR) value,
   a signal to noise and distortion ration (SNDR) value,
   a block error rate (BLER) value,
   a received signal strength indicator (RSSI) value,
   a reference signal received power (RSRP) value,
   a reference signal received quality (RSRQ) value, or
   a channel quality indicator (CQI) value.

17. The one or more non-transitory computer-readable media of claim 15, wherein the radio condition metric is directly indicated in the UE report.

18. The one or more non-transitory computer-readable media of claim 15, wherein the operations further comprise:
   identifying a value included directly within the UE report; and
   deriving the radio condition metric based on the value included directly within the UE report.

19. The one or more non-transitory computer-readable media of claim 15, wherein the two-layer uplink criteria indicates:
   a threshold value associated with the radio condition metric,
   that the UE is to use the two-layer uplink configuration based on a value of the radio condition metric being equal to or higher than the threshold value, and
   that the UE is to use the uplink CA configuration based on the value of the radio condition metric being less than the threshold value.

20. The one or more non-transitory computer-readable media of claim 15, wherein the operations further comprise:
   receiving an update to the two-layer uplink criteria from a network operator computing device; and
   adjusting the two-layer uplink criteria based on the update,
   wherein the update indicates a change to a type of the radio condition metric or a threshold value of the radio condition metric associated with the two-layer uplink criteria.

* * * * *